United States Patent
Donaldson

(10) Patent No.: US 7,431,314 B2
(45) Date of Patent: Oct. 7, 2008

(54) HANDLING DEVICE FOR WHEEL ASSEMBLY COMPONENTS

(75) Inventor: Randy L. Donaldson, Waco, TX (US)

(73) Assignee: International Tire Shuttle, Inc., Waco, TX (US)

( * ) Notice: Subject to any disclaimer, the term of this patent is extended or adjusted under 35 U.S.C. 154(b) by 708 days.

(21) Appl. No.: 10/950,265

(22) Filed: Sep. 24, 2004

(65) Prior Publication Data

US 2006/0082086 A1    Apr. 20, 2006

(51) Int. Cl.
B62B 1/10  (2006.01)

(52) U.S. Cl. .................................. 280/47.27; 280/79.4

(58) Field of Classification Search .............. 280/79.11, 280/79.2, 79.4, 79.5, 79.6, 63, 47.131, 47.17, 280/47.15, 47.19, 47.18, 47.24, 47.26; 414/426, 414/428, 427, 429

See application file for complete search history.

(56) References Cited

U.S. PATENT DOCUMENTS

| | | | | |
|---|---|---|---|---|
| 1,358,235 | A | * | 11/1920 | Nylin .................... 280/47.34 |
| 1,431,861 | A | * | 10/1922 | Adams .................... 414/449 |
| 1,517,951 | A | * | 12/1924 | Cade .................... 280/47.27 |
| 1,800,679 | A | * | 4/1931 | Day .................... 280/47.27 |
| 1,892,979 | A | | 1/1933 | Clark |
| 2,329,613 | A | | 9/1943 | Hokanson et al. |
| 2,483,908 | A | | 10/1949 | Jackson |
| 3,777,923 | A | | 12/1973 | Padgett |
| 4,241,930 | A | | 12/1980 | Bell et al. |
| 4,681,330 | A | * | 7/1987 | Misawa .................... 280/47.2 |
| 5,299,826 | A | * | 4/1994 | Flowers .................... 280/651 |
| D347,981 | S | | 6/1994 | Suggs, Sr. |
| D349,385 | S | | 8/1994 | Suggs, Sr. |
| 5,356,163 | A | | 10/1994 | Suggs, Sr. |
| 5,367,732 | A | | 11/1994 | Suggs, Sr. |
| 5,378,004 | A | * | 1/1995 | Gunlock et al. ............ 280/47.2 |
| D367,141 | S | | 2/1996 | Suggs et al. |
| 5,513,838 | A | | 5/1996 | Van Rossum |
| 5,820,140 | A | * | 10/1998 | Huang .................... 280/30 |
| 5,938,396 | A | * | 8/1999 | Audet .................... 414/490 |
| 6,106,214 | A | | 8/2000 | Saffelle et al. |
| 6,120,042 | A | | 9/2000 | Mosher et al. |

(Continued)

FOREIGN PATENT DOCUMENTS

FR    2 036 471 A    12/1970

(Continued)

*Primary Examiner*—Christopher P. Ellis
*Assistant Examiner*—Bridget Avery
(74) *Attorney, Agent, or Firm*—Bracewell & Giuliani LLP

(57) ABSTRACT

A wheeled hand truck installs, removes, and transports rim-mounted tires and brake drums for vehicles. The truck comprises an elongated frame and extended fork section supported by a transverse axle having wheels at the ends bracketing the frame. The frame includes a handle section extending opposite the fork section that terminates in a grip. The fork section extends opposite the handle for straddling beneath a tire or drum on both sides of its center of gravity. The tire rests against the handle portion and fork, while the drum is mounted in a movable cylinder. The tire or drum is transported by balancing the weight of the tire on the wheels while pushing on the grip. The truck also has an extended lift step for providing leverage, a kickstand, an oil catch pan for brake drum drips, and grab pins for spoke-type hub and drum assemblies.

20 Claims, 7 Drawing Sheets

U.S. PATENT DOCUMENTS

| | | |
|---|---|---|
| 6,135,466 A | 10/2000 | Irwin |
| 6,332,620 B1 | 12/2001 | Mosher et al. |
| 6,386,560 B2 | 5/2002 | Calender |
| 6,851,684 B2 * | 2/2005 | Krumm et al. ............ 280/47.27 |
| D532,954 S * | 11/2006 | Donaldson ................... D34/24 |
| 2001/0054806 A1 | 12/2001 | Calender |
| 2003/0151218 A1 | 8/2003 | Swaffield |

FOREIGN PATENT DOCUMENTS

| | | |
|---|---|---|
| WO | 2006/098768 A2 | 9/2006 |

* cited by examiner

HANDLING DEVICE FOR WHEEL ASSEMBLY COMPONENTS

BACKGROUND OF THE INVENTION

1. Technical Field

The present invention relates in general to a wheeled hand truck for handling wheel assembly components and, in particular, to an improved system, method, and apparatus for a wheeled hand truck for handling and transporting vehicle rim-mounted tires and brake drums during installation or removal thereof.

2. Description of the Related Art

It is difficult to change a heavy, rim-mounted tire on a vehicle from its axle hub located beneath the vehicle fender. The installer must lift the weight of the rim and tire while simultaneously aligning the lug bolts on the hub with matching holes in the rim. Only then can the tire be engaged with the lugs and nuts installed to secure the rim to the axle. If the installer has no manipulating tools to assist him, he must perform these activities while reaching under the fender and supporting the rim and tire, promising him at best soiled clothing and threatening injuries.

Rim-mounted tires for large trucks or tractors offer even greater challenges because of their greater weight. Some rim-mounted truck tires weigh in excess of two hundred pounds, making them almost impossible to lift by hand in such awkward circumstances, while tractor tires generally are too heavy to lift by hand at all. Further, tandem or dual wheels on larger trucks require installation and removal of tires recessed much farther beneath the fender than on conventional automobiles. The brake drum assemblies for these types of vehicles are equally cumbersome to manipulate during removal or installation. A need exists for a tire and brake drum manipulating device that facilitates installation and removal of rim-mounted tires and brake drums for larger, industrial-type applications.

Furthermore, truck and tractor tires and brake drums can be a challenge just to lift off the floor and to stand upright for relocation. For example, conventional practice dictates that a lever bar be inserted beneath the sidewall of the tire and lifting pressure applied to the handle end of the lever to lift one side of the tire off the floor. The operator then repeatedly must support the weight of the inclined tire while he resets the lever to lift the tire farther, thereby ratcheting the side of the tire upward until the tire stands upright on its tread. During this activity, the operator must laterally control the weight of the rim and tire to prevent it from rolling off the lever bar. If the operator loses control during this activity, he must dodge away and let the tire fall back to the floor or risk back or leg strain trying to manhandle the tire without the lever for assistance. A need exists for a safer method and apparatus for lifting heavy, rim-mounted tires and brake drums.

Once a tire or brake drum has been lifted into an upright position, it can be rolled into place for installation onto a vehicle. At the vehicle fender, however, space for rolling it back and forth while working it toward the axle hub is restricted, requiring a series of very short rolling operations alternately turning it to direct its progress in the desired direction. The same activity is required during removal. As the tire or drum progresses toward the axle hub during installation, the operator must reach farther and farther under the fender to support and manipulate it or crawl under the fender with it. The latter option is especially hazardous because the space is constricted, causing the operator to crouch in an awkward position and increasing the risk of injury and of losing control. A need exists for a device to assist in translating a truck or tractor tire or brake drum beneath a vehicle fender for installation onto the axle hub and for removal.

SUMMARY OF THE INVENTION

One embodiment of a system, method, and apparatus for handling the components of a large vehicle wheel assembly comprises a wheeled hand truck for installing, removing and transporting rim-mounted tires and brake drums for vehicles. The truck comprises an elongated frame and extended fork section supported by a transverse axle having wheels at either end bracketing the frame. The frame includes a handle section extending opposite the fork section to terminate in a grip, and the fork section extends opposite the handle for straddling the tire on either side of its center of gravity and beneath its tread. The tire rests against the handle portion and separate tire rests over each wheel, and the tire may be transported by balancing the weight of the tire on the wheels while pushing on the grip.

The present invention also includes a number of auxiliary features that further enhance the usability and functionality of the device. For example, an lift step extends from the frame of the truck for providing leverage in lifting a tire or drum. The lift step may be positioned centrally with respect to the frame of the truck, or extending from one of the side fenders of the tuck. A kickstand is similarly provided on one of the side fenders for supporting the truck in an upright position when it is not loaded with a tire or drum. The truck further comprises an oil catch pan for catching any fluid drips from brake drums as they are maneuvered or transported by the truck. In addition, the present invention includes grab pins for spoke-type hub and drum assemblies.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
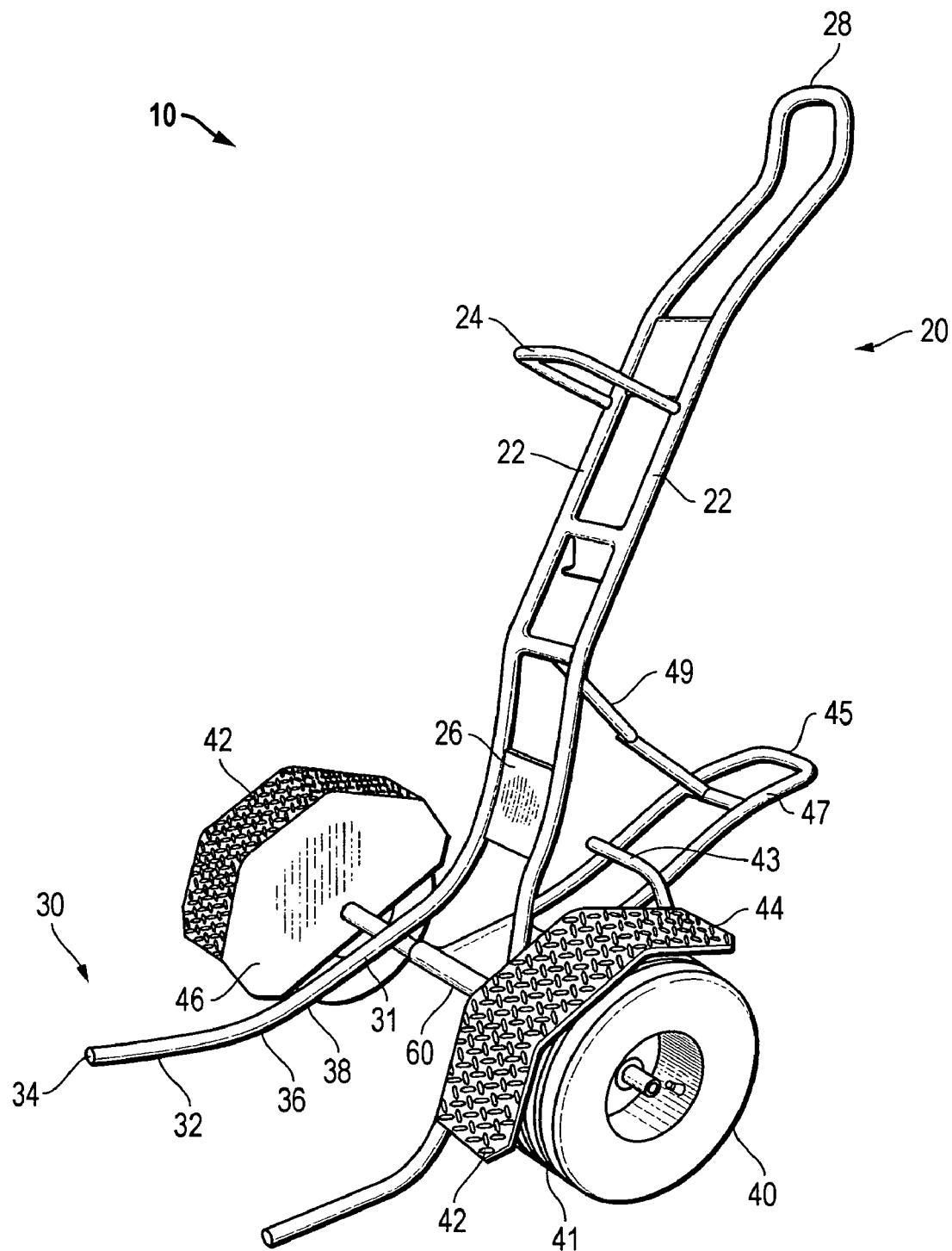
FIG. 1 is an isometric view of one embodiment of a hand truck constructed in accordance with the present invention.
Figure 2:
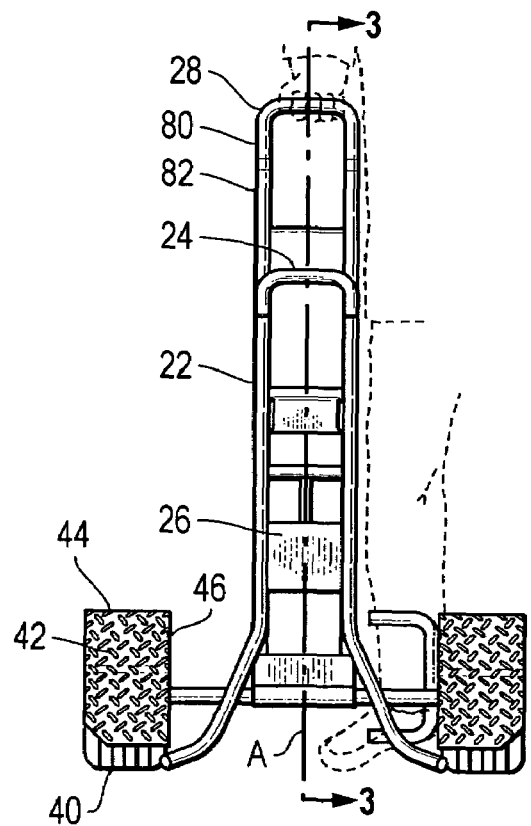
FIG. 2 is a front elevational view of the hand truck of FIG. 1.
Figure 3:
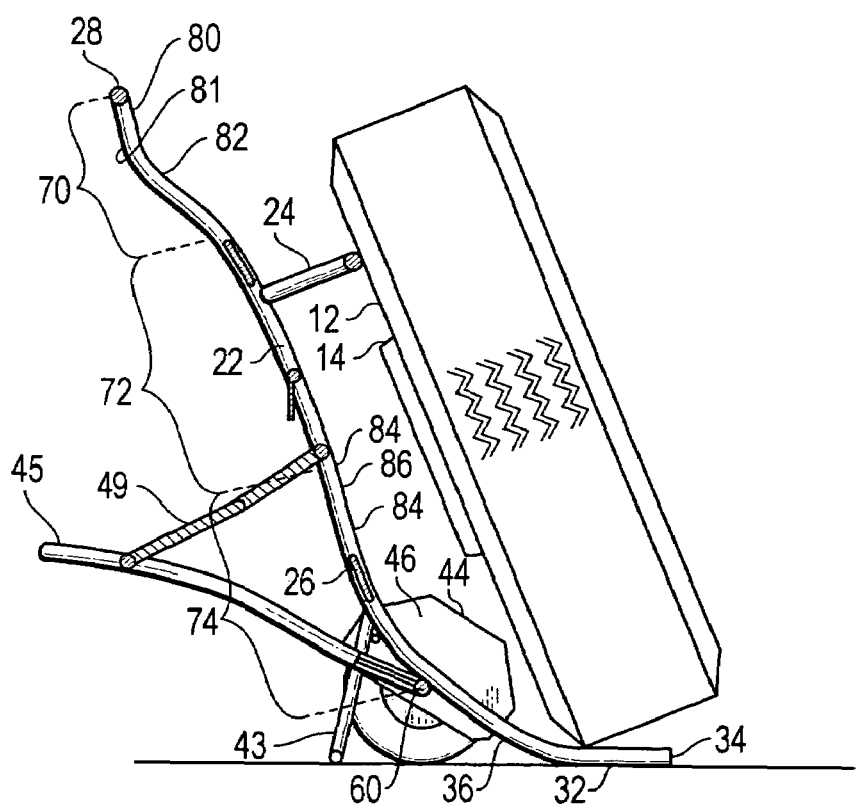
FIG. 3 is a sectional side view of the hand truck of FIG. 1 taken along the line 3-3 of FIG. 2, and is shown with a tire resting in position for transportation.

With reference now to the figures, and in particular to FIGS. 1, 2, and 3, hand truck 10 of the present invention is designed to support a rim-mounted tire 12 or brake drum for transportation and manipulation. Symmetric about longitudinal axis A, coincident with section lines 3-3 of FIG. 2, truck 10 comprises an elongated frame 20 extending between one or more braces or plates 26 proximate transverse axle 60 and grip 28 at the distal end of frame 20. In the embodiment shown, the frame 20 comprises a pair of bars. In the embodiment shown, frame 20 has two brace plates and two brace bars located between the two brace plates.

A fork section 30 extends opposite frame 20 from plate 26 and couples to axle 60. Axle 60 is located beneath a lowermost one of the braces or plates 26. Fork section 30 comprises two divergent, segmented tines 31, each tine 31 further comprising leg 36 coupled to foot 32 adapted to rest on the floor or ground when truck 10 is supporting tire 12.

Wheels 40 are carried on the ends of the axle 60 bracket to support truck 10 and serve as a fulcrum. The tires on wheels 40 are solid, closed-cell polyurethane for improved control of truck 10. Fenders 44 are coupled to axle 60 and span the treads of wheels 40 to provide an operator a place to brace his foot against truck 10 to assist him with controlling truck 10. Attached to fenders 44 are tire rest surfaces 42 against which tire 12 leans as shown in FIG. 3. Tire rest surfaces 42 and fenders 44 are shown formed from a single sheet of, for example, diamond plate that is bent into planar portions covering parts of the tread of wheels 40 and coupled to axle 60 by an inner plate 46. Inner plates 46 are parallel to the longitudinal axis A and cover inner portions of the wheels 40.

Frame 20 further comprises central deck portion 72 (FIG. 3) flanked by handle portion 70 and basket portion 74. Deck 72, handle 70, basket 74 and fork 30 preferably are formed from a single length of steel bar 22 bent at appropriate places to form the components described symmetric about axis A. One having ordinary skill in the relevant art will recognize that such components could alternately be formed separately and joined as required using suitable means such as welding. Further, they all need not be made of the same material, but may vary according to the stresses experienced by each component. When made from unitary bar stock, bars 22 are preferably three-quarter inch (¾") 4140 Alloy rod, which is heat treated. In one version, the frame is hydraulic formed, MIG welded, and machine finished. Though highly resistant to bending, this grade of steel is soft enough to bend double rather than snap under excess loads, providing a desirable safety feature. Alternately, forged tool steel rated at similar specifications satisfies these criteria. One having ordinary skill in the art will recognize, however, that the diameter and strength selected depend upon the expected loads. For example, the steel bar required for satisfactory lifting of automobile and light duty truck tires is smaller in diameter than that needed for lifting much heavier truck and tractor tires, and truck 10 can be made of the smaller bar and retain satisfactory resiliency and resistance to bending. Further, one having ordinary skill in the art will recognize that all grades of steel meeting such criteria, as well as others less desirable and even other materials such as rigid aluminum and high strength thermoplastics may serve the purpose under certain loading conditions and are considered within the spirit and scope of the present invention.

As seen in FIG. 3, portions of bar 22 comprising deck 72 form a plane substantially parallel to the plane of tire 12 when it is resting on truck 10. A rest or prop 24 extends generally perpendicular to deck 72 to engage the top of tire 12, tire rest surfaces 42 engage either side of tire 12 proximate axle 60, and feet 32 of fork section 30 engage the tread of tire 12 at two places on its lower perimeter to prevent tire 12 from sliding downward. Grooves 38 cut into transverse bar 22 in fork section 30 provide traction to the tread of tire 12 to prevent slippage.

With tire 12 in the position shown in FIG. 3, its center of gravity remains substantially forward (toward feet 32) of axle 60, rendering stable truck 10 while sitting upright. With its weight so distributed, rim-mounted tire 12 can be towed long distances using truck 10 with relatively little exertion by the operator, unlike with conventional dollies, the load of which must be carefully balanced on the wheels lest the operator bear it himself. In fact, even with truck 10 laid down with handle 70 contacting the floor, deck 72 lies substantially parallel to the floor or tilted slightly toward feet 32. This keeps the load of rim-mounted tire 12 astraddle axle 60, balancing the weight across that fulcrum and requiring relatively little force to lift grip 28. Obviously, with loads having higher centers of gravity (along axis A toward grip 28), the balance point will shift relative to axle 60, but this does not occur with wider loads (transverse to axis A), and truck 10 may be used to transport rather easily planar loads substantially wider than the separation of wheels 40.

Handle 70 comprises a substantially U-shaped portion of bar 22 having two arms 82 coupled to deck 72 and extending parallel to each other but in a different plane from deck 72. Elbows 81 join arms 82 to divert fingers 80 into yet a different plane, fingers 80 coupling to opposite ends of grip 28. Grip 28 is thereby offset back toward the plane of deck 72. This offset protects from injury the hand of an operator who permits truck 10 to pivot about axle 60, especially under the weight of tire 12, until handle 70 contacts the floor. The offset also provides a means of reaching under grip 28 when elbows 81 rest on the floor. Further, elbows 81 comprise the apex of an angular offset of handle 70 from the plane of deck 72, the offset preferably selected to cause deck 72 to be substantially parallel to the floor when elbows 81 contact the floor.

Basket section 74 also forms an offset in frame 20 from the plane of deck 72, providing a cavity into which rim 14 of rim-mounted tire 12 may extend. This offset prevents contact by truck 10 with rim 14 and precludes scratching rim 14. Basket section 74 comprises a plurality of joints 86 coupled end-to-end at angles 84 between deck 72 and fork section 30. Plate 26 extends between one parallel set of joints 86 to define the separation between portions of bar 22 forming frame 20. Preferably, grip 28 substantially matches in length the spacing effected by plate 26, causing the corresponding portions of bar 22 on opposite sides of longitudinal axis A of truck 10 to be parallel, though one having ordinary skill in the art will recognize that they need not be parallel.

As best seen in FIG. 2, this spacing between corresponding portions of bar 22 in frame 20 is substantially less than the spacing between wheels 40 and feet 32 supporting tire 12. Such spacing permits an operator to stand on either side of frame 20 behind axle 60 as shown in FIG. 2, thereby accommodating either left-handed or right-handed operators. Since the center of gravity of tire 12 should coincide with axis A, the closer the operator can stand to axis A the more easily he can manipulate truck 10 using grip 28. One having ordinary skill in the art will recognize that the proportions implied by FIG. 2 are not controlling, and all variations in the width and shape of frame 20 are within the spirit and scope of the present invention.

Truck 10 further comprises a kickstand 43 and a lift step 45. Kickstand 43 is pivotally mounted to inner plate 46 and pivots between an upright disengaged position (FIG. 1) wherein truck 10 is unsupported by kickstand 43, and a lower engaged position (FIG. 3) wherein truck 10 is supported in an upright position by kickstand 43. The kickstand 43 allows the truck 10 to be easily parked.

The lift step 45 protrudes centrally from the rear side of truck 10 and is a rigid, integral portion of the bar 22 for providing leverage for pivoting the hand truck about the axle. In the embodiment shown, lift step 45 is generally designed similar in shape as bar 22, although in a smaller, shorter version. Lift step 45 extends rearward and upward from the axle and is symmetrical about the longitudinal axis. Lift step 45 has a strut 49 extending from one of the braces to a step portion of the lift step. Lift step 45 provides excellent leverage for the user in tilting truck 10 rearward (see FIG. 3). In the embodiment of FIG. 3, the lift step 45 extends further rearward that a rearwardmost portion of handle 28.

Figure 4A:
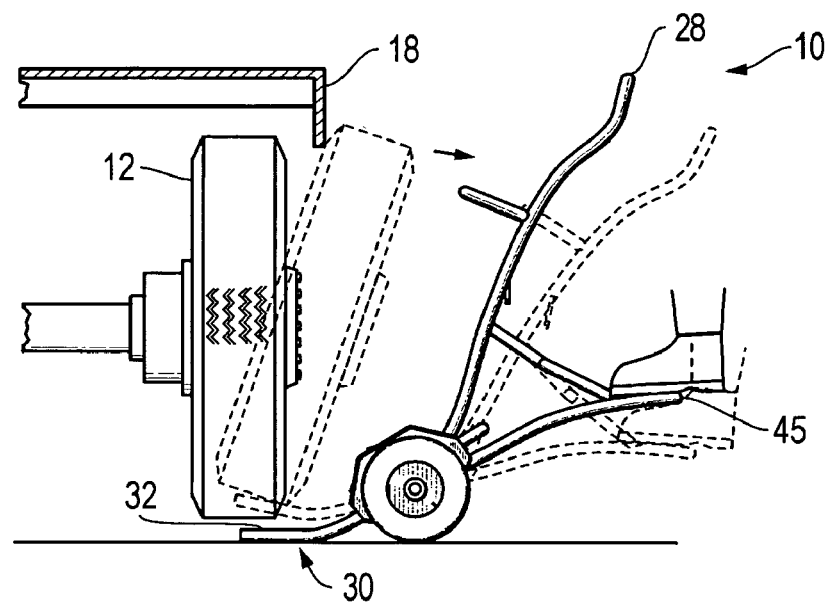
FIGS. 4a and 4b are side views of the hand truck of FIG. 1 during removal and installation, respectively, of a tire.

In operation, truck 10 may be used to remove tire 12 from vehicle 18 without necessity of reaching under the fender by the operator. As seen in FIG. 4a, the operator places feet 32 of fork section 30 beneath the tread of tire 12 and pushes down on grip 28. This lifts feet 32 to engage tire 12, and further lifting will cause truck 10 to bear the weight of tire 12. The operator may then place a foot onto lift step 45 or fender 44 and push truck 10 slightly toward vehicle 18, causing tire 12 to tilt toward truck 10. The operator then pulls truck 10 away from vehicle 18, carrying tire 12 with it until lugs 17 clear lug holes 15 on rim 14. At this point, vehicle 18 no longer supports tire 12, and it may fall against tire rest surfaces 42 and prop 24.

Figure 4B:
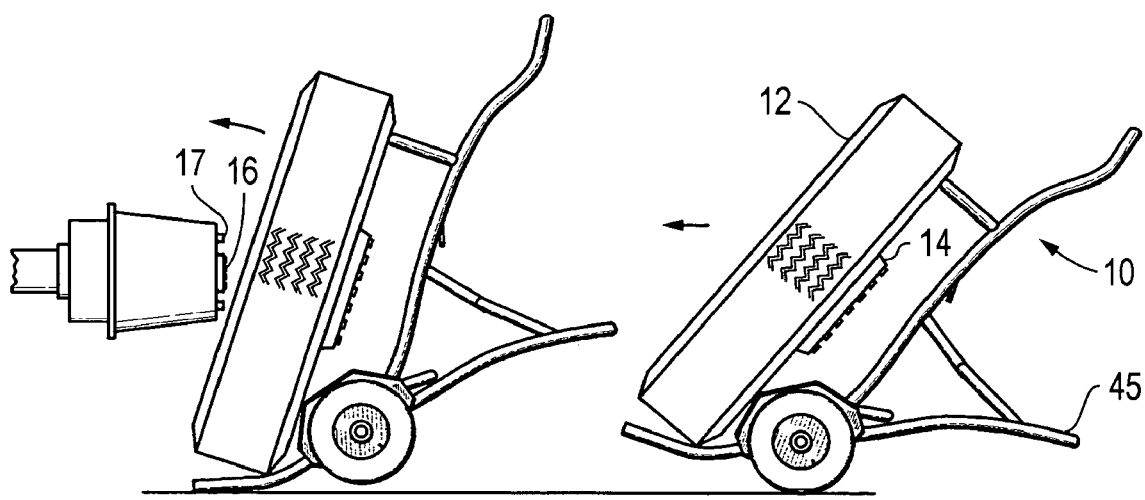

If the operator reaches under the fender of vehicle 18 to the top of tire 12 during this operation, he can steady tire 12 and better control its release from vehicle 18, but experiments have shown that this is not required. Once tire 12 begins to fall toward truck 10, the operator can lift grip 28 to engage feet 32 with the floor and bring prop 24 closer to tire 12, as shown in FIG. 4b. This technique better controls the descent of tire 12 than permitting it to fall while wheels 40 remain in contact with the floor. Experiments have shown, however, that this also in not necessary because of stability resulting from the separation of tines 31.

As seen at the right in FIG. 4b, truck 10 supports tire 12 for transportation. In fact, truck 10 will support tire 12 without the operator holding grip 28, because the center of gravity of tire 12 rests forward of wheels 40 and axle 60. Thus, the operator may move the loaded truck 10 aside and park it until tire 12 is needed later. Tire 12 will not roll off of truck 10 because a portion of tire 12 extends below feet 32, which straddle the center of gravity of tire 12.

Tire 12 may be dumped off of truck 10 by lifting grip 28, as shown at the left of FIG. 4b, until tire 12 falls away from truck 10 onto the floor. Truck 10 may also be used to lift a prone tire 12 from the floor (not shown). The operator shoves feet 32 as far under the sidewall of tire 12 as he can and then depresses grip 28 until elbows 81 contact the floor, using his foot once it becomes convenient to do so as handle 70 nears the floor. While holding tire 12 with his knee, the operator then repeatedly rolls truck 10 farther under tire 12 to reset it and depresses grip 28 again for further lifting. Once he can engage feet 32 with the tread of tire 12 adjacent the floor, he can let tire 12 rest against tire rest surface 42 and prop 24 and move tire 12 about using truck 10.

Installation proceeds largely in reverse of removal. The operator maneuvers tire 12 into position with truck 10 and then lifts grip 28 to bring feet 32 into contact with the floor and wheels 40 off the floor. This encourages the top of tire 12 into a substantially vertical position immediately in front of the vehicle hub 16 and lugs 17. It should be noted that tire 12 is not just dumped against hub 16, causing impact with lugs 17 by rim 14. Instead, motion demonstrated at the left in FIG. 4b serves simply to stand tire 12 upon its tread directly in front of hub 16. The operator then depresses grip 28 to lift tire 12 vertically and rolls truck 10 toward hub 16 to set tire 12 onto hub 16, reaching under the fender to steady the top of it if necessary. Once its weight is supported by hub 16, tire 12 may be spun until lug holes 15 match lugs 17. Grip 28 again is depressed slightly to lift tire 12 onto lugs 17 and translate rim 14 into position supported by lugs 17. Nuts (not shown) may then be installed to hold rim 14 to vehicle 18.

Figure 5:
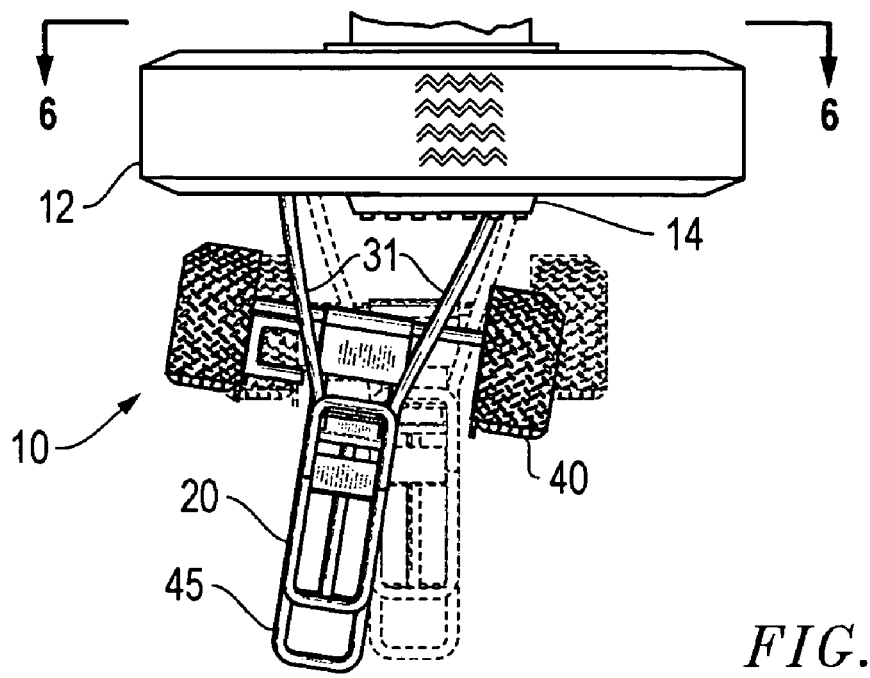
FIG. 5 is a top view of the hand truck of FIG. 1 showing the rotational manipulation of the tire to align lug holes in the rim with lugs on the vehicle hub.
Figure 6:
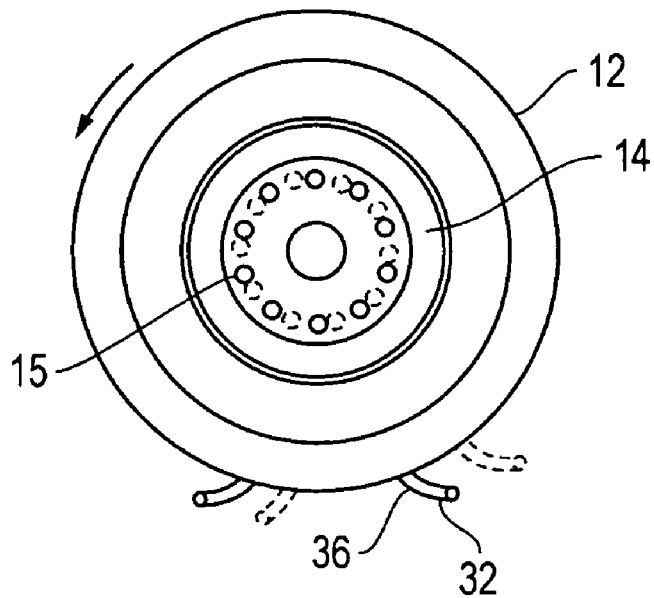
FIG. 6 shows the effect on the tire of the operation depicted in FIG. 5.

FIGS. 5 and 6 demonstrate a method by which truck 10 may be used to align lug holes 15 with lugs 17. Once hub 16 supports tire 12, feet 32 are placed under and in contact with the tread of tire 12 but not lifting enough to support it. The operator then horizontally translates grip 28 to pivot truck 10 about its own center of gravity at axle 60, causing feet 32 to translate in the opposite direction. This in turn causes tire 12 to rotate, as shown in FIG. 6. With practice, an operator can learn to spin a tire just enough to align lugs 17 and lug holes 15 with very little effort and without having to reach far under the fender of vehicle 18.

Figure 7:
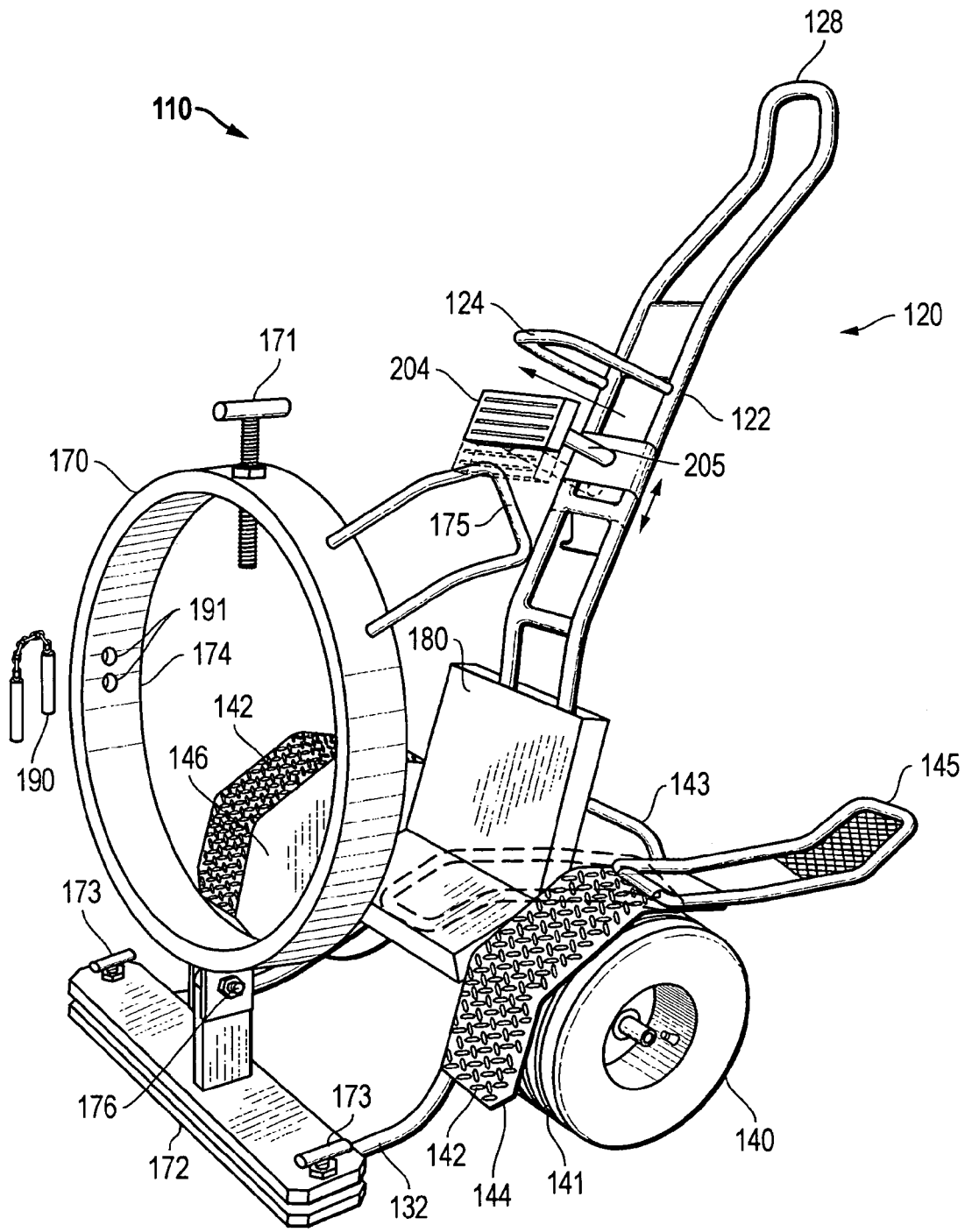
FIG. 7 is an isometric view of another embodiment of a hand truck constructed in accordance with the present invention.
Figure 8:
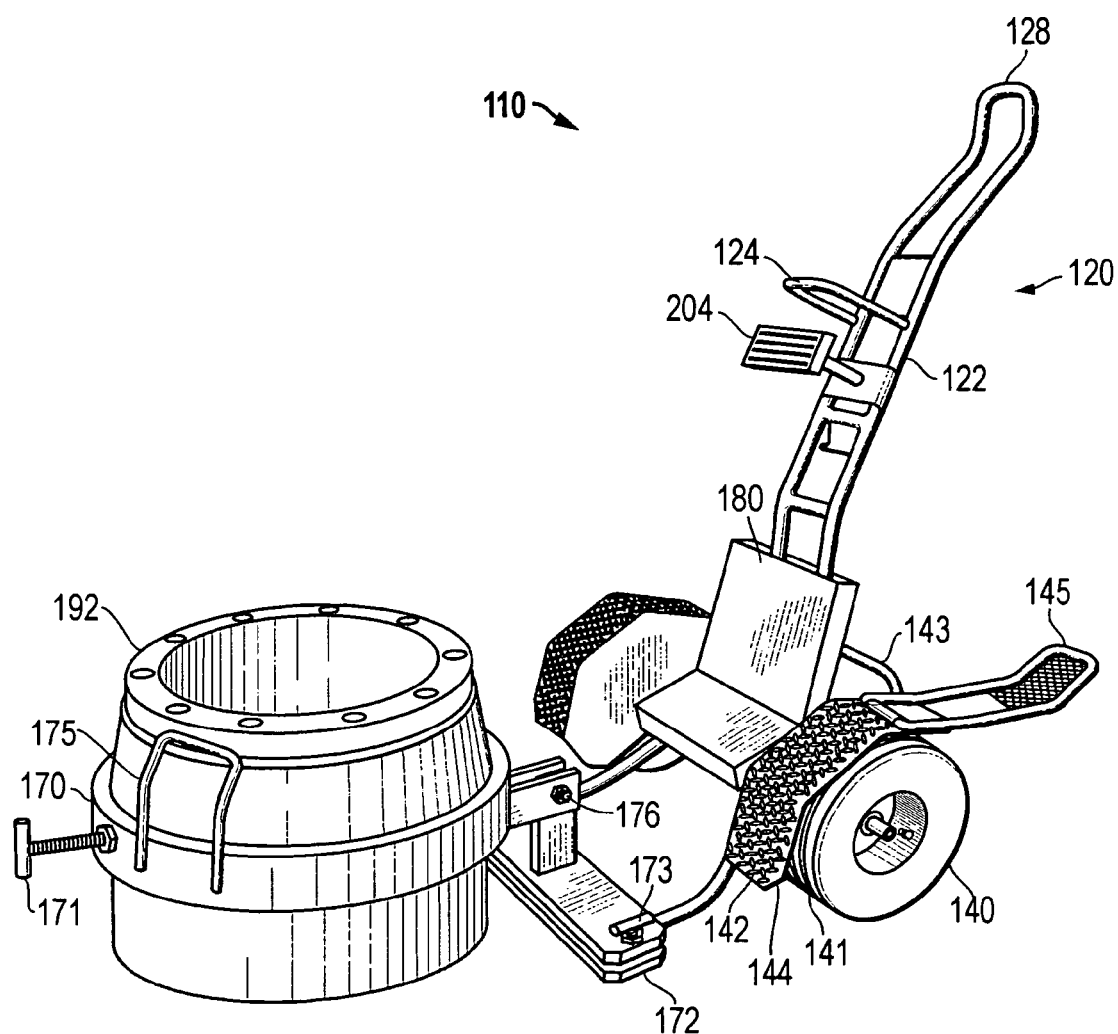
FIG. 8 is an isometric view of the hand truck of FIG. 7 shown loaded with a brake drum.

Referring now to FIGS. 7 and 8, another embodiment of present invention is depicted as hand truck 110. Truck 110 has many of the same features as truck 10, but also includes several other optional features. The reference numerals for hand truck 110 track those of hand truck 10, but are enumerated as a "1xx" series (e.g., fender 144 in FIG. 7 is the same as fender 44 in FIG. 1, etc.).

Truck 110 also has an additional rest 204 that is adjustable both axially along its shaft 205 (i.e., perpendicular to the axis) and longitudinally along the length of frame 122. Rest 204 is ideally suited for resting a hub thereon, but also may be used to rest smaller diameter tires as well. Truck 110 also includes a rearward-extending lift step 145, but it is mounted to one of the fenders 144, and smaller and slightly shorter in length than the previously described lift step 45 on truck 10. However, this lift step 145 is pivotable to a forward-extending, non-use position (shown in phantom in FIG. 7) when it is not needed. Note that the shape of lift step 145 is contoured to match the shape of fender 144 in the non-use position.

In addition, truck 110 incorporates an brake drum handling kit 170, described below, that attaches to feet 132. An drip catch pan 180 mounts to the frame 122 adjacent the axle for catching any fluid drips or debris, such as from a brake drum or other object mounted in kit 170. The catch pan 180 may form a trough for containing liquid, and has an upper portion extending along the frame, and a lower portion extending from the upper portion in a substantially horizontal configuration at an angle of approximately 120° relative to the upper portion.

A set of grab pins 190 is also provided for engaging spoke-type hubs (not shown) through apertures 191 in ring 174. The simple installation of the brake drum handling kit 170 is made of high quality sheared and punched steel plate. It is attached to the truck 110 using grade 8 bolts. The cinch handle 171 is acme threaded for reliability. When combined with the truck 110, the kit 170 provides a mechanic with a brake drum remover, installer, transporter, and manipulator.

To use the kit 170, the feet 32 are positioned in the custom guides 172 and tightened, without tools, via cinch handles 173. The mechanic approaches the brake drum taking advantage of several appliance features. The ring 174 is controlled using up and down movement of the handle 128, while accuracy of alignment is accomplished by holding the ring handle 175. By cranking the cinch handle 171 downward, the drum 192 (FIG. 8) is safely secured and ready for manipulation over worn shoes and corrosion. These steps are performed with hands clear of the drum 192.

Once secure, the drum 192 is ready for removal. At this point, the mechanic has the choice of placing the drum safely on the floor, discarding it, or tilting the truck 110 back, thereby creating an inspection platform table for preventative maintenance. Vacating the brake drum attachment is done by tilting forward the oscillating ring 174, via pivot 176, then allowing the handle 128 to move forward under control until the drum 192 is safely deposited. Loosen the cinch handle 171 and lift clear.

Replacing the inspected or repaired drum is a reverse of the initial operation. The truck 110 is tilted forward with the ring 174 over the drum 192. The drum 192 is tightened to the ring 174 using the cinch handle 171, and the truck 110 is tilted back. The mechanic uses a tri-axis feature of the truck 110 to mount the drum 192 over the stubborn brake shoes with limited exertion. The truck 110 holds the drum 192 in place while the mechanic aligns the lugs by gently turning the hub and slips the drum 192 into place. After the drum 192 is in place, it is released via the cinch handle 171.

Another feature of the kit 170 is its ability to remove inboard hubs from brake drums. The mechanic starts by attaching the combined drum and hub to the ring 174 and tightening the cinch handle 171. Once secure, the unit is reclined in the "work bench" position (FIG. 8, in phantom). While reclined, the mechanic can easily access the bolts and nuts on the top and bottom of the drum and hub, and the bolts and nuts are removed, separating the drum from the hub. The mechanic then inserts the grab-pins 190 in the lower holes of the hub via apertures 191 (FIG. 7). The mechanic removes the oil catch pan 180, which rests underneath the hub and drum, catching loose debris and oil released therefrom when the bolts are removed. This feature helps maintain a clean shop floor and helps keep the mechanic clean as well.

The mechanic picks up the unit by lifting up on the handle 128. Once in the upright position, the unit is tilted forward by applying slight pressure on the fender 144. While holding the ring handle 175, the mechanic tilts the hub forward until it stops on the floor. The handle 128 is used as leverage to drop the drum and hub to the floor. Once the drum and hub are solid and level, the grab pins 190 automatically release, fully separating the drum from the hub. Finally, the mechanic lifts the truck 110 upright and pulls the ring handle 175 upright to successfully deposited the drum on the floor. The grab pins 190 are then retrieved from beneath the drum.

To install a new or repaired drum to an inboard hub, the mechanic begins by tilting the secured hub over the drum and gently places the hub on top, of the drum. The mechanic aligns the holes of the drum and hub and places the grab pins 190 into the two holes on the bottom side of the hub, so that the drum is lifted safely and correctly. Next, the mechanic tilts the drum back and places the unit back in the workbench position. Once reclined and level, the grab pins 190 automatically release. The mechanic then places the bolts back in place. The mechanic can easily place his impact beneath the drum and hold the bolt with a wrench on top of the hub. Once the bolts are tightened correctly, the unit tilts upright and parks in place until the mechanic is ready to install the inboard hub and drum.

Figure 9:
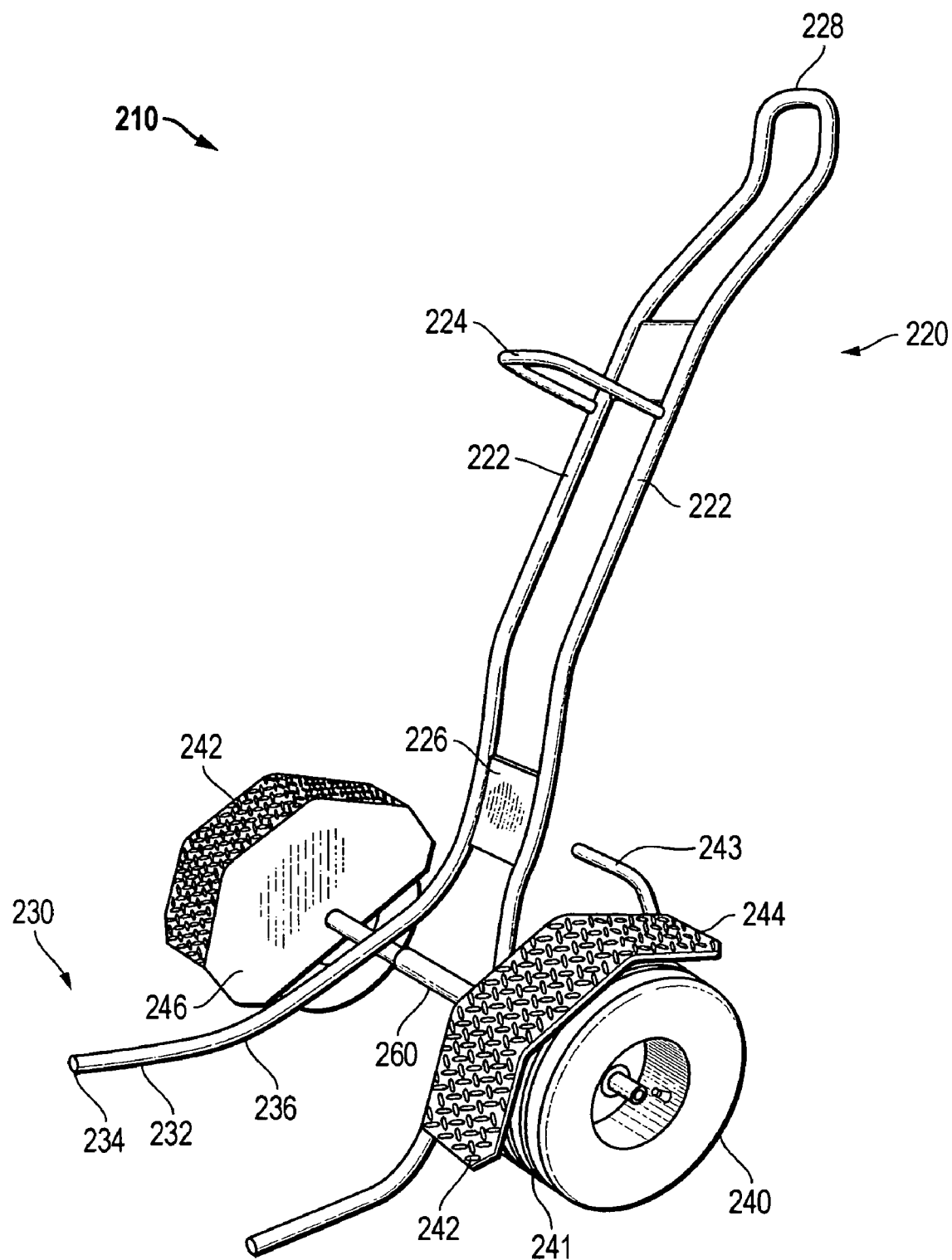
FIG. 9 is an isometric view of yet another embodiment of a hand truck constructed in accordance with the present invention.

Referring now to FIG. 9, yet another embodiment of the present invention is shown as hand truck 210. Hand truck 210 is virtually identical to hand truck 10 of FIGS. 1-6, except that it does not have any form of a lift step (see, e.g., lift step 45 in FIG. 1). The reference numerals for hand truck 210 track those of hand truck 10, but are enumerated as a "2xx" series (e.g., fender 244 in FIG. 9 is the same as fender 44 in FIG. 1, etc.).

The present invention has several advantages, including the ability to handle and manipulate tires, wheels, and brake drums from the wheel assemblies of heavy duty vehicles. The hand truck's auxiliary features enhance the usability and functionality of the device. The lift step extends from the frame or fender of the truck and provides ample leverage in lifting a tire or drum. The kickstand is similarly provided on one of the side fenders for supporting the truck in an upright position. The truck further comprises an oil catch pan for catching any fluid drips from brake drums as they are maneuvered or transported by the truck. In addition, the present invention includes grab pins for spoke-type hub and drum assemblies.

While the invention has been particularly shown and described with reference to a preferred embodiment, it will be understood by those skilled in the art that various changes in form and detail may be made therein without departing from the spirit and scope of the invention. For example, FIG. 2 implies an overall size of truck 10 relative to an adult human, but substantial variations both larger and smaller may be appropriate for larger or smaller tires, though truck 10 as depicted in FIG. 2 can serve for tires substantially smaller or larger than tire 12 shown in FIG. 3. As another example, truck 10 could be adapted for use as a hand dolly for other transporting and lifting duties, either for general use or for other specialty applications. If outfitted with an angled plate (not shown) or other device spanning the separation between feet 32, truck 10 could carry or lift objects much smaller or narrower than tires, as well as objects wider than the separation of wheels 40. Used thusly for transporting heavy appliances, truck 10 offers the advantage of a lowered center of gravity and balance thereof over axle 60 in contrast to conventional upright dollies.

What is claimed is:

1. A hand truck for handling an object, comprising:
   a frame having a longitudinal axis and a pair of bars extending generally along the longitudinal axis, the pair of bars terminating, on one end, in a transverse handle and, on an opposite end, the pair of bars terminating as a fork, the fork having two divergent, segmented tines terminating in feet;
   a plurality of braces extending between the pair of bars, and each brace being generally perpendicular to the longitudinal axis;
   an axle transverse to the longitudinal axis and coupled to each tine and having a pair of wheels rotatably mounted on opposite ends of the axle;
   a fender coupled to the axle and covering a portion of each of the pair of wheels to define a pair of fenders, the fenders being accessible by a user from rearward the truck;
   a rest mounted to the frame and adapted to support the object supported by the feet when leaned against the rest; and
   a kickstand pivotally mounted to one of the fenders, the kickstand being movable between an upright disengaged position wherein the hand truck is unsupported by the kickstand on an underlying surface, and a lower engaged position wherein the hand truck is supported in an upright parked position by the kickstand on the underlying surface.

2. The hand truck of claim 1, wherein the braces comprise two brace plates located on opposite sides of the rest.

3. The hand truck of claim 1, wherein the braces comprise two brace plates and two brace bars located between the two brace plates.

4. The hand truck of claim 1, further comprising a lift step mounted to the hand truck and extending rearward of the frame, the lift step being adapted to allow a user to provide leverage with a foot of the user for pivoting the hand truck about the axle.

5. The hand truck of claim 1, wherein the rest is mounted to the frame and extends perpendicular thereto, the rest forming a bearing surface offset from the frame and adapted to engage a portion of the object.

6. The hand truck of claim 1, wherein each of the fenders comprises a plate fender having a plurality of planar surfaces for providing leverage and support of the object, each of the fenders also having an inner plate that is parallel to the longitudinal axis covering an inner portion of a respective one of the wheels, and the kick stand is mounted to one of the inner plates.

7. The hand truck of claim 1, further comprising a catch pan mounted to the frame adjacent the axle and adapted to catch debris from the object when the object is located on the feet.

8. The hand truck of claim 1, further comprising a second rest mounted to the frame beneath said rest, the second rest being adjustable in directions both parallel and perpendicular to the longitudinal axis, and adapted to support the object when leaned against the second rest.

9. The hand truck of claim 1, further comprising a brake drum kit mounted to the feet and adapted to mount, unmount, transport, and manipulate a brake drum relative to a vehicle, the brake drum kit comprising grab pins for engaging spoke-type hub and drum assemblies.

10. The hand truck of claim 4, wherein the lift step extends rearward and upward from the axle and is symmetrical about the longitudinal axis, the lift step having a strut extending from one of the braces to a step portion of the lift step.

11. The hand truck of claim 10, wherein the lift step extends rearward and upward from one of the fenders, the lift step being pivotally mounted to said one of the fenders such that the lift step is pivotable between a rearward extending operational position, and a forward extending non-operational storage position.

12. The hand truck of claim 7, wherein the catch pan forms a trough for containing a liquid, the trough having an upper portion extending along the frame, and a lower portion extending from the upper portion in a substantially horizontal configuration at an angle of approximately 120° relative to the upper portion.

13. A hand truck for mounting, unmounting, transporting and manipulating a tire, the hand truck comprising:
a frame having a longitudinal axis and a pair of bars extending generally along the longitudinal axis, the pair of bars terminating, on one end, in a transverse handle and, on an opposite end, the pair of bars terminating as a fork, the fork having two divergent, segmented tines terminating in feet;
a plurality of braces extending between the pair of bars, and each brace being generally perpendicular to the longitudinal axis;
an axle transverse to the longitudinal axis and coupled to each tine beneath a lowermost one of the braces, and having a pair of wheels rotatably mounted on opposite ends of the axle;
a fender coupled to the axle and covering a portion of each of the pair of wheels to define a pair of fenders, the fenders being accessible by a user from rearward the truck;
a rest mounted to and extending perpendicular relative to the frame, the rest forming a bearing surface offset from the frame and adapted to engage a leaned portion of the tire when the tire is supported by the feet; and
a lift step mounted to the hand truck and extending rearward of the frame, the lift step being adapted to allow a user to provide leverage with a foot of the user for pivoting the hand truck about the axle, the lift step extending rearward and upward from the axle and being symmetrical about the longitudinal axis, the lift step having a strut extending from one of the braces to a step portion of the lift step.

14. The hand truck of claim 13, further comprising a kickstand pivotally mounted to one of the fenders, the kickstand being movable between an upright disengaged position wherein the hand truck is unsupported by the kickstand on an underlying surface, and a lower engaged position wherein the hand truck is supported in an upright parked position by the kickstand on the underlying surface.

15. The hand truck of claim 13, wherein each of the fenders comprises a plate fender having a plurality of planar surfaces for providing leverage and support the tire, each of the fenders also having an inner plate that is parallel to the longitudinal axis covering an inner portion of a respective one of the wheels.

16. The hand truck of claim 13, further comprising a catch pan mounted to the frame adjacent the axle and adapted to catch debris, wherein the catch pan forms a trough for containing a liquid, the trough having an upper portion extending along the frame, and a lower portion extending from the upper portion in a substantially horizontal configuration at an angle of approximately 120° relative to the upper portion.

17. The hand truck of claim 13, further comprising:
a brake drum kit mounted to the feet and adapted to mount, unmount, transport, and manipulate a brake drum relative to a vehicle, the brake drum kit having grab pins for engaging spoke-type hub and drum assemblies; and
a second rest mounted to the frame beneath said rest, the second rest being adjustable in directions both parallel and perpendicular to the longitudinal axis, and adapted to support the brake drum when leaned against the second rest.

18. A hand truck for mounting, unmounting, transporting and manipulating a tire, the hand truck comprising:
a frame having a longitudinal axis and a pair of bars extending generally along the longitudinal axis, the pair of bars terminating, on one end, in a transverse handle and, on an opposite end, the pair of bars terminating as a fork, the fork having two divergent, segmented tines terminating in feet;
a plurality of braces extending between the pair of bars, and each brace being generally perpendicular to the longitudinal axis;
an axle transverse to the longitudinal axis and coupled to each tine beneath a lowermost one of the braces;
a pair of wheels rotatably mounted on opposite ends of the axle;
a fender coupled to the axle and covering a portion of each of the pair of wheels to define a pair of fenders, the fenders being accessible by a user from rearward the truck, each of the fenders comprising a plate fender having a plurality of planar surfaces for providing leverage and support the tire, each of the fenders also having an inner plate that is parallel to the longitudinal axis covering an inner portion of a respective one of the wheels;

a rest mounted to the frame and adapted to support the tire supported by the feet when leaned against the rest, the rest extending perpendicular to the frame and forming a bearing surface offset from the frame and adapted to engage a portion of the tire;

a kickstand pivotally mounted to one of the fenders, the kickstand being movable between an upright disengaged position wherein the hand truck is unsupported by the kickstand on an underlying surface, and a lower engaged position wherein the hand truck is supported in an upright parked position by the kickstand on the underlying surface;

a lift step mounted to the hand truck and adapted to provide leverage for pivoting the hand truck about the axle, the lift step extending rearward and upward from one of the fenders, the lift step being pivotally mounted to said one of the fenders such that the lift step is pivotable between a rearward extending operational position, and a forward extending non-operational storage position; and a catch pan mounted to the frame adjacent the axle and adapted to catch debris.

19. The hand truck of claim 18, wherein the catch pan forms a trough for containing a liquid, the trough having an upper portion extending along the frame, and a lower portion extending from the upper portion in a substantially horizontal configuration at an angle of approximately 120° relative to the upper portion.

20. The hand truck of claim 18, further comprising:

a brake drum kit mounted to the feet and adapted to mount, unmount, transport, and manipulate a brake drum relative to a vehicle, the brake drum kit comprising grab pins for engaging spoke-type hub and drum assemblies; and a second rest mounted to the frame beneath said rest, the second rest being adjustable in directions both parallel and perpendicular to the longitudinal axis, and adapted to support the brake drum when leaned against the second rest.

* * * * *